UNITED STATES PATENT OFFICE.

THOMAS WILLIAM STAINER HUTCHINS, LUKE HARGREAVES, AND ALFRED CHARLES DUNNINGHAM, OF MIDDLEWICH, ENGLAND.

PROCESS FOR THE PRODUCTION OF SODIUM BISULFITE.

1,216,452.  Specification of Letters Patent.  Patented Feb. 20, 1917.

No Drawing.  Application filed August 16, 1916.  Serial No. 115,302.

*To all whom it may concern:*

Be it known that we, THOMAS WILLIAM STAINER HUTCHINS, LUKE HARGREAVES, and ALFRED CHARLES DUNNINGHAM, D. Sc., all of Electro Bleach & By-Products, Limited, subjects of the King of Great Britain and Ireland, and residents of Middlewich, Cheshire, England, have invented certain new and useful Improvements in the Process for the Production of Sodium Bisulfite, of which the following is a specification.

This invention relates to the manufacture of sodium bisulfite and has for its object to provide an improved process whereby the bisulfite may be produced in either solid or liquid form in an economical and efficient manner.

The invention consists in so disposing, as hereinafter more particularly defined, a mass or masses of hydrated carbonate or a mixture of hydrated carbonates or of the anhydrous and hydrated carbonates of sodium, that upon the passage of gaseous sulfur dioxid thereinto, carbon dioxid is progressively generated, which proceeding through the said mass or masses in advance of the sulfur dioxid, converts the carbonates into a form in which they are more readily acted upon by the sulfur dioxid for the production of the bisulfite.

The invention further consists in the employment in the process above indicated, of equimolecular proportions of the carbonates and their combined water so as to obtain the bisulfite in a solid form.

The invention further consists in the employment in the process above indicated of a carbonate or carbonates having such proportions of combined water that water is set free during the reaction and gives a concentrated bisulfite solution.

The invention further consists in employing hydrates, hydrated carbonates or a mixture of anhydrous and hydrated carbonates of the alkali or alkaline earth metals for a preliminary purification treatment of the gases generated or resulting from the combustion of sulfur in the atmosphere for the production of the required sulfur dioxid, so that oxygen and sulfur trioxid are eliminated and sulfur dioxid and nitrogen (together with carbon dioxid if a carbonate be used) pass forward from the purifier for utilization in the above indicated process, the sulfur dioxid (and if present the carbon dioxid) acting upon the mass or masses of the material in the manner indicated, and the nitrogen and resulting carbon dioxid serving, if desired, to drive off any sulfur dioxid occluded in the finished solid product.

In carrying out our improved process for the production, for example, of solid sodium bisulfite, we employ a series of towers or vessels charged with a powdered mixture of soda crystals and soda ash, and cause dry sulfur dioxid gas to pass therethrough.

It is essential that the mass shall be so disposed that the entering gas cannot act upon the whole or practically the whole thereof and so convert it directly into sodium bisulfite but that a relatively small area shall be exposed to such gas and the distance through the mass be of considerable length whereby the double reaction before specified and hereinafter more particularly referred to, results.

The quantities of soda ash and soda crystals are so adjusted, due regard being had to the degree of purity of the soda ash, that the carbonate and water are present in equimolecular proportions. The action of the sulfur dioxid at the commencement of the process results in the generation of carbon dioxid according to the formula:—

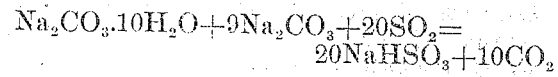

$$Na_2CO_3.10H_2O + 9Na_2CO_3 + 20SO_2 = 20NaHSO_3 + 10CO_2$$

The carbon dioxid in its turn now acts upon the portion of the mixture not yet acted upon by the sulfur dioxid converting same into bicarbonate of soda according to the following formula:—

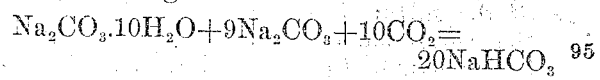

$$Na_2CO_3.10H_2O + 9Na_2CO_3 + 10CO_2 = 20NaHCO_3$$

The sodium bicarbonate has a very uniform porosity and is in a very efficient condition for the action thereon of the sulfur dioxid gas, the reaction being represented as follows:—

$$NaHCO_3 + SO_2 = NaHSO_3 + CO_2$$

It will be seen that in accordance with our process, except at the commencement of the reaction when the sulfur dioxid acts directly upon the mixture of carbonates, the reaction is accomplished in two stages, the first stage being that in which the mixture is converted into bicarbonate by carbon dioxid and the second that in which the bicarbonate is converted by the sulfur dioxid into bisulfite with liberation of carbon dioxid.

Any one or more of the towers or reaction vessels may be disconnected for discharging and charging purposes without interfering with the progress of the process in the remaining towers or vessels.

Instead of employing a mixture of soda crystals and soda ash as aforesaid, we may employ the mono-hydrated carbonate ($Na_2CO_3.H_2O$): the reactions are, however, the same and the process proceeds as before described.

By the employment of the above process, we obtain a solid bisulfite in a pure dry form in an efficient and economical manner.

This solid product may be utilized for the direct production of solid sodium sulfite in dry powder form, without previous evaporation or drying, by allowing the same to react with anhydrous sodium carbonate, which is preferably in the form of soda ash, the reaction being represented as follows:—

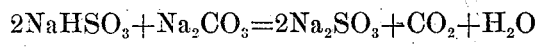

It will of course be understood that the dry solid body may be used for preparing a hot saturated sulfite solution, from which the crystalline salt will separate on cooling without previous evaporation.

If it is desired to obtain concentrated bisulfite liquor by our improved bisulfite process, we employ soda crystals ($Na_2CO_3.10H_2O$) only in the towers or reaction vessels so that water is liberated during the formation of the bicarbonate of soda. Such water trickles down the towers or vessels and dissolves the bisulfite formed at a lower level. The reactions accompanying this modification of our bisulfite process are the same as those hereinbefore described namely, the generation of carbon dioxid by the action of the sulfur dioxid on the soda crystals, the conversion of soda crystals to sodium bicarbonate by the carbon dioxid, with however, the liberation of water, and the production of bisulfite from the bicarbonate by the action of sulfur dioxid. By feeding the soda crystals into the tops of the towers and drawing off the bisulfite liquor, the process can be carried on continuously. The liquor produced is a concentrated bisulfite solution.

In order to minimize the amount of impurity in the finished product, we provide for a preliminary purification of the sulfur dioxid before it is employed in the bisulfite producing process so that any oxygen and sulfur trioxid which may be produced during the combustion of sulfur in the atmosphere for the production of the sulfur dioxid, may be effectually eliminated. For this purification treatment, we employ a tower or vessel charged with a hydrate, hydrated carbonate, or a mixture of anhydrous and hydrated carbonates of the alkali or alkaline earth metals. The sulfur dioxid entering the tower converts the material into bisulfite which is then oxidized by any free oxygen and also by the sulfur trioxid present, with the production of bisulfate and the liberation of sulfur dioxid. The latter, together with the nitrogen of the air in which the sulfur was burned, then passes to the ordinary reaction towers or vessels in which the bisulfite either in solid or liquid form is to be produced.

If the purifying tower be charged with a hydrated carbonate or a mixture of anhydrous and hydrated carbonates, then there will issue from the tower sulfur dioxid, carbon dioxid and nitrogen (from the atmosphere). The carbon dioxid and sulfur dioxid will then act on the material in the reaction towers or vessels.

By the aforesaid purification process, we eliminate the production of bisulfate in the ordinary reaction towers or vessels. The rate of generation and supply of the sulfur dioxid gas may be varied by varying the rate of supply of the air for combustion by a fan, pump or other means.

From the last of the series of the reaction towers or vessels, a mixture of carbon dioxid and nitrogen issues, and we employ this to drive out the sulfur dioxid occluded in the solid bisulfite product, transferring each tower or vessel, as the reactions therein are completed, to the end of the series of towers, this being accomplished by means of suitable valves and connections or otherwise. The sulfur dioxid driven off in the aforesaid manner may be recovered and utilized in the towers where the reactions are still proceeding.

During the reactions occurring in our improved process considerable heat is evolved: the cooling of the reaction tower may be taken as an indication that the reaction therein is completed.

We desire it to be understood that we make no claim to the mere action of sulfur dioxid gas upon sodium carbonate for the direct production of sodium bisulfite, such reaction being well known and having been accomplished in various types of apparatus having for their object to insure a more intimate contact of the gas and solid by dividing the latter up into powder form and agitating it continuously in the presence of the gas. In accordance with our invention, the efficiency of the action depends upon the effect of the carbon dioxid liberated by the sulfur dioxid gas which gives the material into which it passes a very uniform porosity, so that the sulfur dioxid gas is readily absorbed, without the necessity for agitating the materials or crushing them to powder.

Having now described our invention what we claim as new and desire to secure by Letters Patent is:—

1. The herein described process for the manufacture of sodium bisulfite consisting in subjecting a closely packed stationary charge of sodium carbonate, at least in part hydrated, to gaseous sulfur dioxid to convert a portion directly into bisulfite with the liberation of carbon dioxid; subjecting the remaining portion of the charge first to the action of the evolved carbon dioxid to convert it into a bicarbonate of marked porosity and then to the action of sulfur dioxid to convert said bicarbonate into bisulfite in the desired form, the evolved carbon dioxid proceeding through the charge in advance of the sulfur dioxid.

2. The herein described process for the manufacture of sodium bisulfite consisting in subjecting a minor portion of a charge of sodium carbonate, at least in part hydrated to provide equimolecular proportions of carbonate and combined water, to gaseous sulfur dioxid to convert said minor portion directly into bisulfite with the liberation of carbon dioxid; subjecting the remaining portion of the charge first to the action of evolved carbon dioxid to convert it into a bi-carbonate of marked porosity and then to the action of sulfur dioxid to convert said bicarbonate into bisulfite in the desired form.

3. The process for the manufacture of sodium bisulfite wherein sodium carbonate at least in part hydrated to provide equimolecular proportions of carbonate and combined water, is subjected to the action of gaseous sulfur dioxid so that after the initial direct conversion of a portion of the carbonate into bisulfite with the liberation of carbon dioxid, the remaining portion of the carbonate is subjected to a double reaction consisting of the conversion of the carbonate into bicarbonate by the previously liberated carbon dioxid and the subsequent conversion of the bicarbonate to bisulfite by the sulfur dioxid, the finished product having the nitrogen and carbon dioxid issuing from the treated materials passed therethrough to drive off any sulfur dioxid occluded in the bisulfite, as set forth.

In testimony whereof we have signed our names to this specification in the presence of two subscribing witnesses.

THOMAS WILLIAM STAINER HUTCHINS.
LUKE HARGREAVES.
ALFRED CHARLES DUNNINGHAM.

Witnesses:
ARTHUR HUGHES,
HULDA HUGHES.